March 30, 1926.
R. C. HUME
PIPE JOINT
Filed Sept. 21, 1925
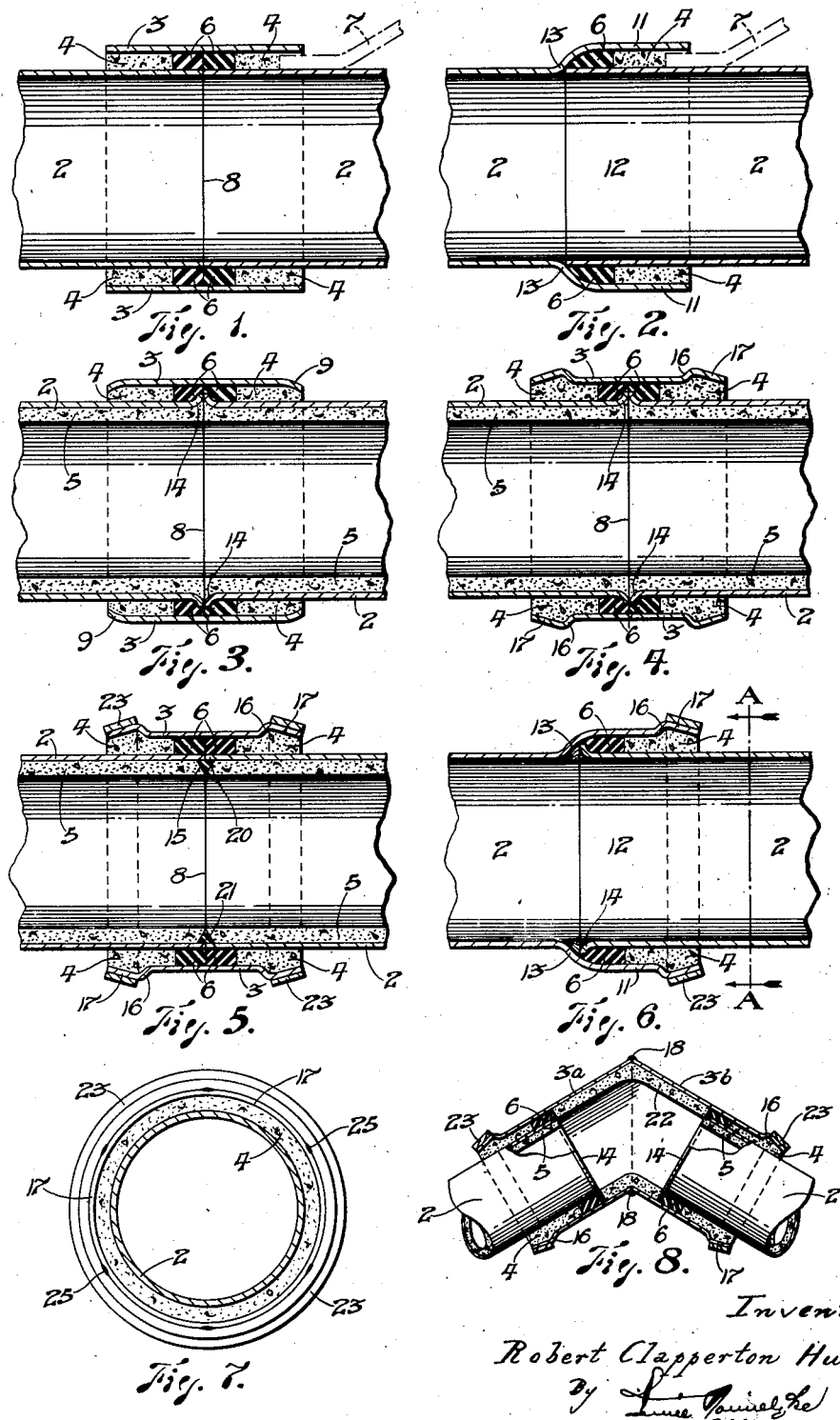
Inventor:
Robert Clapperton Hume Patented Mar. 30, 1926.

1,578,734

UNITED STATES PATENT OFFICE.

ROBERT CLAPPERTON HUME, OF COBURG, VICTORIA, AUSTRALIA.

PIPE JOINT.

Application filed September 21, 1925. Serial No. 57,721.

*To all whom it may concern:*

Be it known that I, ROBERT CLAPPERTON HUME, a subject of the King of Great Britain and Ireland, and a resident of 11 Clarendon Street, in the city of Coburg, county of Bourke, State of Victoria, Commonwealth of Australia, have invented certain new and useful Improvements Relating to Pipe Joints, of which the following is a specification.

This invention relates to pipe joints and more particularly refers to the jointing together of the ends of relatively thin or sheet metal pipes with or without an internal lining of concrete.

According to this invention the abutting or adjoining pipe ends are surrounded by a collar preferably of relatively light or sheet metal, a permanently plastic sealing material, such, for instance, as a bituminous composition, being rammed or caulked into the annular space between the said collar and the outer periphery of the pipes around the adjoining ends thereof. The end portions of said annular space are closed by a relatively hard or unyielding filling material such as cement, lead wool or the like which is rammed tightly into said annular space and against the plastic sealing material by inserting a suitable tool through the open ends of the surrounding collar, or, in the case of the faucet and spigot joint, through the open end of the faucet which, in this case, takes the place of the aforesaid collar.

By the above arrangement, the internal pressure of the fluid passing through the pipe line tends to force the plastic sealing material outwardly in a longitudinal direction against the filling material at the end or ends of the annular space so that, owing to the spreading action of the plastic material, the internal pressure increases the security or non-leaking properties of the joint.

The invention also embodies other features such as the inturning and special formation of the end portions of the metal collar or faucet, the outturning of the abutting or adjoining pipe ends, the special formation of the collar for angular or bent joints, and the employment of a stiffening ring or rings around the end or ends of the faucet or collar as hereinafter described.

But in order that this invention may be better understood reference will now be made to the accompanying sheet of drawings which are to be taken as part of this specification and read herewith:—

Figure 1 is a longitudinal section showing a collar type of joint according to the invention, applied to the jointing of two sheet metal pipes. In dot and dash lines a caulking tool is indicated as in use to caulk or ram the filling material into the joint.

Figure 2 is a view similar to Figure 1 but showing the application of the invention to a faucet and spigot joint.

Figure 3 shows the collar type of joint in accordance with the invention applied to two concrete lined metal pipes the abutting or adjoining ends of which are turned outwardly whilst the ends of the surrounding collar are turned inwardly in accordance with the invention.

Figure 4 is a view similar to Figure 3 but showing a modified and preferred formation of the ends of the metal collar.

Figure 5 is a sectional view of the collar type of joint illustrating the use of external stiffening rings around the ends of the sheet metal collar.

Figure 6 shows the faucet type of joint embodying a special formation of the faucet end and showing the external stiffening ring thereon in accordance with the invention.

Figure 7 is a cross section taken on line A—A of Figure 6 and looking in the direction of the arrows.

Figure 8 is a part sectional view on a reduced scale showing the invention applied to a collar joint in which the two pipes to be joined are disposed at an angle to each other.

In forming a joint in accordance with the invention around the plain ends of two metal pipe sections 2 which may be concrete lined as at 5, a surrounding collar or sleeve 3 of metal (preferably sheet metal), is placed around the adjoining and aligned pipe ends, said collar being preferably secured to one of the pipe ends prior to the introduction of the ends of the adjoining pipe section. To thus secure the collar to one of the pipes, a filling material 4 of concrete, lead wool or other suitable material of a relatively hard and unyielding nature is packed or rammed tightly into the annular space between the collar 3 and the exterior of the pipe so as to hold the latter securely in position and securely close one end of the annular space. This filling material does not extend to the adjacent extremity of the respective pipe section a space being left between such extremity and the concrete or like filling material to receive a plastic sealing material 6 as hereinafter described.

The said plastic sealing material indicated at 6 is preferably of a bituminous nature such as the bituminous composition described in prior Commonwealth Patents Nos. 12435/14 and 4087/17 but other suitable material, which will permanently retain its plastic or yielding consistency and will not be dissolved or detrimentally affected by the fluid passing through the pipe line, may be employed. This plastic material may be moulded or extruded in the form of a strip so that it may be conveniently placed around the end of the pipe between the external periphery of the latter and the surrounding collar. It is then tightly caulked within the inner or intermediate portion of the annular space between the pipe and collar, by means of a suitable caulking tool as indicated at 7 which is introduced through the open end of the collar whereby the plastic material is rammed tightly against the adjoining concrete or other relatively hard filling material which closes the opposite end of the annular space as aforesaid.

The other pipe section 2 may now be introduced into the collar so that its extremity closely adjoins the extremity of the first pipe section as indicated at 8, the pressure of the fluid which passes through the pipe line being communicated through the slight space between said extremities, to the surrounding plastic sealing material 6 as hereinafter described. The result is that the plastic material 6 is forced longitudinally outwards against the relatively hard or inflexible filling material 4 which closes the end portions of the annular space and holds the collar securely in position.

A further body of the plastic sealing material 6 is now inserted and tightly caulked into position around the end of the second pipe section so that the slight space between the adjoining extremities of the two pipes is completely sealed by the plastic substance. By the insertion of a doubled sheet of paper or other suitable material (not shown) a slight space, corresponding to the space between the adjoining pipe extremities, may, if desired, be left between the two bodies of plastic material so that the internal fluid is free to enter between the two plastic bodies and thereby exert an outward endwise or longitudinal pressure thereon to thus increase the automatic sealing properties of the joint.

A second body of the concrete, lead wool, or other filling material 4 is now rammed into the annular space within the other end portion of the surrounding collar and against the second body or insertion of plastic material above referred to.

The plastic sealing substance is now securely housed within the annular space between the collar and the pipe and between the two bodies of concrete or other filling material which is packed into said space at either side of the joint.

The ends of the sheet metal collar 3 may be bent slightly inwards towards the pipe as at 9, to more securely retain the filling material in position and increase the efficiency of the joint.

In applying the invention to the jointing of faucet and spigot ended pipes, as seen in Figure 2, the plastic sealing material 6 is caulked or rammed into the annular space between the metal faucet 11 and the spigot end 12 which is surrounded thereby, the slight space between the spigot extremity and the adjacent internal shoulder 13 of the faucet, permitting the internal fluid pressure to force the plastic material outwardly against the filling material 4, as aforesaid. After the plastic substance has been thus inserted and caulked into position the cement, lead wool, or other filling material 4 is rammed tightly into the annular space between the faucet and spigot ends and against the plastic substance so that the latter is effectively retained in position and an effective leak-proof joint is formed.

In order to prevent buckling or bending inwardly of the ends of the relatively thin metal pipe during the caulking or ramming operation, and to strengthen the pipe ends, the latter may be turned outwardly as at 14 so as to form an outturned circumferential lip or flange which greatly strengthens the pipe end and enables the material to be tightly caulked or rammed into said annular space without bending or damaging the adjoining end portions of the pipe sections. The outturned circumferential lip or flange 14 also serves to partially enclose the plastic sealing material 6 at the joint, thus preventing such plastic material leaking out of the annular space and into the pipe under conditions of extreme heat.

A further advantage of the outturned circumferential lip or flange 14 is that it assists in centralizing the collar or faucet so that this surrounding member is kept in its proper concentric position during the ramming or caulking operation. In addition the outturned lip or flange forms a buttress against which the plastic material can be very tightly caulked by longitudinal pressure exerted by a suitable tool which is passed through the open ends or end of the surrounding collar or faucet.

In applying the invention to the jointing of the ends of concrete lined pipe sections as shown in Figure 5, the concrete lining may, if desired, be chamfered or bevelled as at 15 to form a recess between the abutting or adjoining ends of the concrete lining and the resultant overhanging ends 20 of the metal pipe casing 2. This recess is adapted to accommodate a sealing ring 21 which may be composed of the plastic sealing material before mentioned, and co-operates with the plastic body 6 to further seal the joint.

Instead of bending the ends of the collar or the end of the faucet inwardly as indicated at 9 in Figure 3, said end portions may be placed within a suitable machine and pressed to form a slight outwardly projecting rib or shoulder 16 from which the respective end portion of the collar or faucet converges inwardly as at 17 to its adjacent extremity as shown in Figures 4 to 8. By thus pressing the collar ends into a convergent form after the bending into shape and jointing of the meeting edges of the collar, a truly circular article may be formed, the outwardly pressed rib or shoulder 16 serving to greatly strengthen the collar or faucet whilst the longitudinally converging ends 17 serve to form a corresponding tapered or wedge-like annular space which prevents the filling material from being blown or forced out of the joint by the internal pressure of the fluid passing through the pipe line.

The converging end or ends 17 of the collar or faucet may have any desired degree of inclination or convergence but, preferably, this convergence is such that the extreme end or ends of the collar or faucet are of approximately the same internal diameter as, and are disposed in longitudinal alignment with, the intermediate portion thereof as shown in Figures 4 to 6, the outwardly bent rib or shoulder forming a slight enlargement between said intermediate and converging end portions of the collar or faucet. The desired longitudinally converging annular space for the reception of the filling material 4 is thus formed within the end or ends of the collar or faucet without reducing the area of the annular space at its end or ends so as to interfere with the ramming or caulking operation. For this reason as well as for the additional strength imparted to the collar or faucet, and the increased security of the joint, the end formation of the collar or faucet as shown in Figures 4 to 6 is preferred to that shown in Figure 3.

In constructing a collar for jointing together two relatively inclined pipes, and thus forming a bent or angular joint, as in Figure 8, the metal collar is first formed in two straight or curved half lengths or sections, indicated at 3ª and 3ᵇ, one of the end portions of each said section being pressed to form the outstanding rib or shoulder 16 and convergent end 17 as previously mentioned. The other ends of the two half lengths or sections are plain or untapered, and these two ends are now placed together and circumferentially welded as at 18 to secure the two collar sections together in the desired angular or curved relationship.

In forming a joint, as in Figure 8, the metal collar may be placed over the ends of the pipes to be joined prior to the laying of the latter, the internal surface of the angular or curved metal collar being preferably lined with cement as at 22 between the two adjacent pipe extremities to protect said surface from corrosion. The permanently plastic sealing material 6 is then rammed through the open end of the annular space around each of the pipes after which the cementitious filling material 4 is rammed into said space as previously mentioned. The result is that an extremely secure and efficient joint is formed, the longitudinally converging ends 17 of the collar acting to form a wedge-like internal space which effectively prevents the jointing material from being forced out at the open ends of the collar as previously mentioned.

The converging portion 17 at the end of the faucet or at each end of the metal collar may be surrounded externally by a metal stiffening ring 23 which converges on its inner face and also preferably on its outer face so as to correspond with the convergence or taper of the respective end of the collar or faucet. The said stiffening ring may be first forced onto the converging end of the collar or faucet and is then secured thereon preferably by welding it at circumferentially spaced intervals as at 25, to the exterior of the said converging end. By this means the converging end or ends of the faucet or collar are greatly strengthened and the jointing materials may be tightly rammed in through the open end of the annular space without expanding or distorting the converging end of the collar or faucet and thus rendering the jointing material liable to escape or become displaced through the adjacent open end thereof.

Having now described my invention what I claim as new and desire to secure by Letters Patent is:—

1. A pipe joint for concrete lined metal pipes comprising a collar surrounding the ends of two concrete lined pipes and forming an annular space therebetween and the exterior surfaces of the pipes, each pipe having a recess in the concrete lining at the end thereof; a plastic sealing material packed into the annular space around the ends of the pipes and adapted to fill the recesses in the concrete linings; and an unyielding filling material packed within the outer portions of the annular space between the plastic material and the ends of the collar.

2. A pipe joint for concrete lined metal pipes comprising a collar surrounding the ends of two concrete lined pipes and forming an annular space therebetween and the exterior surfaces of the pipes, each pipe having a recess in the concrete lining at the end thereof; a plastic sealing material packed into the annular space around the ends of the pipes and adapted to fill the recesses in the concrete linings; an unyielding filling material packed within the outer portions of the annular space between the plastic material and the ends of the collar and an external metal stiffening ring surrounding and secured to each of the ends of the collar.

3. An improved pipe joint comprising an open ended metal collar surrounding the adjoining ends of two abutting pipes to be joined, thereby forming a continuous annular space between said collar and the exterior of said aligned pipe ends; a plastic sealing material of a yielding nature tightly packed into said annular space so as to partly fill said space around the abutting ends of the pipes; an unyielding filling material packed within the outer portions of said annular space between said plastic material and the ends of said collar, said collar being bent adjacent the ends thereof to form an outwardly projecting rib or shoulder from which the respective end portion of the collar converges longitudinally inwards towards its adjacent extremity; and an external metal stiffening ring surrounding and secured to each of said converging end portions of the collar.

4. An improved pipe joint comprising an open ended metal collar surrounding the adjoining ends of two abutting pipes to be joined, thereby forming a continuous annular space between said collar and the exterior of said aligned pipe ends; a plastic sealing material of a yielding nature tightly packed into said annular space so as to partly fill said space around the abutting ends of the pipes; an unyielding filling material packed within the outer portions of said annular space between said plastic material and the ends of said collar, said collar being bent adjacent the ends thereof to form an outwardly projecting shoulder from which the respective end portion of the collar converges longitudinally inwards towards its adjacent extremity; and an external metal stiffening ring surrounding and secured to each of said converging end portions of the collar, said stiffening ring being of converging or tapered form corresponding to the external converging face of the collar.

In testimony whereof I affix my signature.

ROBERT CLAPPERTON HUME.